Patented Feb. 25, 1936

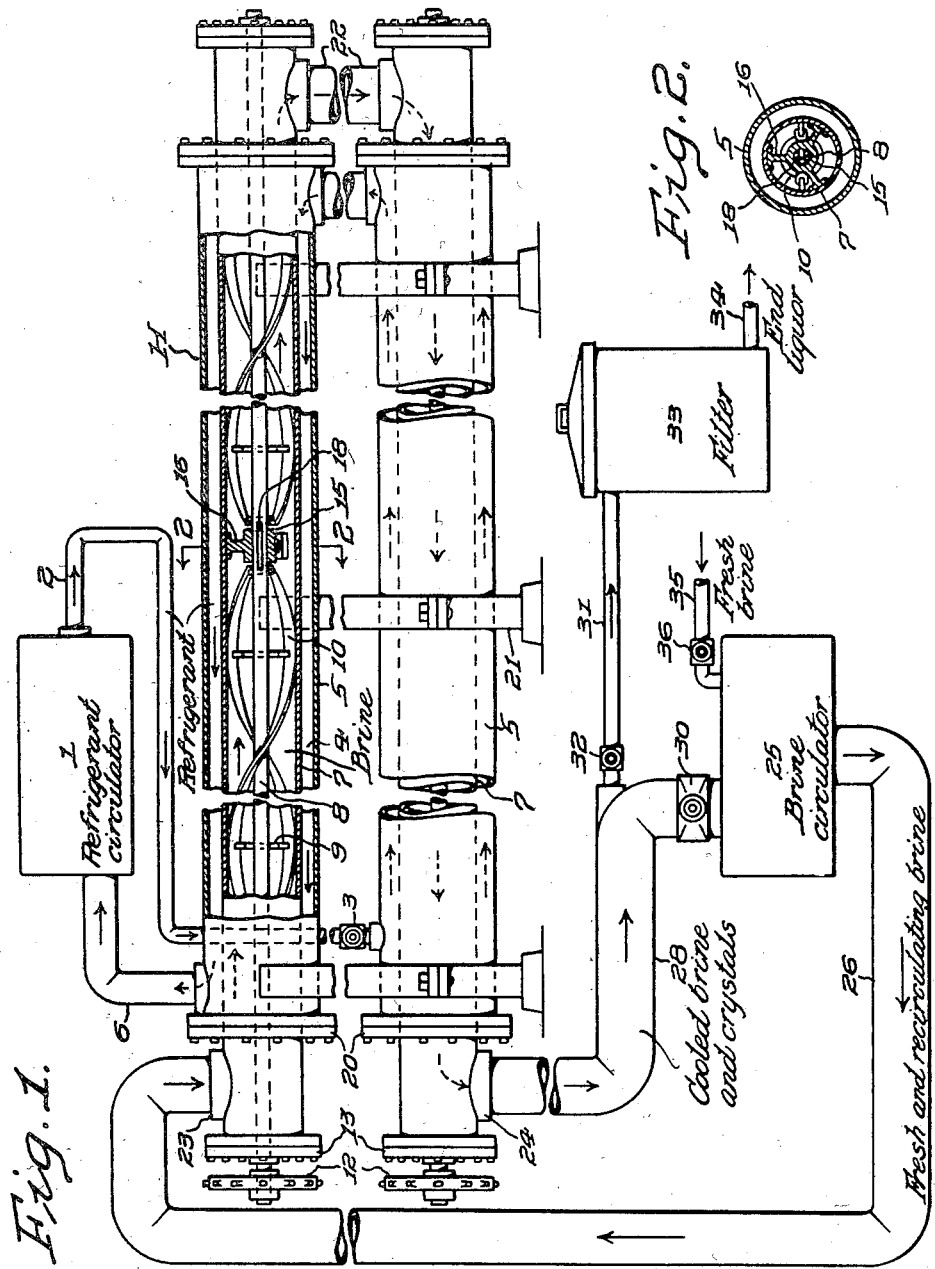

2,032,201

UNITED STATES PATENT OFFICE 2,032,201

APPARATUS FOR RECOVERING CRYSTALLINE SALTS FROM SOLUTIONS

Sidney H. Davis, Tulsa, Okla., Carl O. Anderson, Baxter Springs, Kans., and Rudolph J. Stengl, Monahans, Tex., assignors to Ozark Chemical Company, Tulsa, Okla., a corporation of Delaware Original application September 9, 1932, Serial No. 632,372. Divided and this application June 8, 1935, Serial No. 25,574

2 Claims. (Cl. 259—9)

This invention relates to the recovery of hydrous sodium sulphate, commonly known as Glauber's salt, or other water-soluble salts in a crystalline state from solutions thereof and is particularly directed to an improved apparatus for removing Glauber's salt from natural brines or other solutions of relatively high concentration, particularly in accordance with the method of our invention described and claimed in U. S. Letters Patent 2,007,956, granted to us July 16, 1935, of which this application is a division.

Our invention has been found especially desirable for use in recovering Glauber's salt from the natural brines found in large quantities in certain parts of the United States and elsewhere in salt lakes and/or in underground pools, although, of course, it will be understood that the brine or other solution of the material to be recovered may be supplied from any suitable source.

As is well known, salts and other minerals dissolved in water may be recovered, when the solution is a saturated one, by cooling the solution and thereafter removing the resultant precipitated solids, a conspicuous example of this phenomenon being visible on the shores of the Great Salt Lake during the winter, at which time deposits of Glauber's salt which have been crystallized from the brine of the lake due to the lowering of its temperature may be readily observed.

The cooling of this and similar brines on a commercial scale for the recovery of Glauber's salt or other dissolved substances, has heretofore presented many difficulties arising from, among other things, the tendency of the salt upon crystallization to adhere tenaciously to the walls of the vessel in which it is contained and to the cooling surfaces through which heat transfer is effected in lowering the temperature of the brine and as the insulating properties of such a coating are relatively great, it has consequently been necessary for economic operation to provide additional means for scraping the coating from these surfaces in order to obtain a satisfactory rate of heat transfer; moreover, when circulating chillers have been employed, difficulty has been encountered through the choking of the apparatus from accumulation therein of solidified material requiring dismantling of the apparatus from time to time to permit its removal.

A principal object of our invention, therefore, is to provide novel apparatus for recovering dissolved salts, particularly Glauber's salt, from solutions thereof by crystallization under the influence of reduced temperature.

Another object of the invention is to provide in such apparatus means for facilitating a flow of crystal bearing solution with a minimum of obstruction to its travel at a high velocity without excessive deposition of solids from the solution on the walls and other parts of the unit.

Other objects, advantages and novel features of our invention will hereinafter more fully appear or be understood from the following description of an apparatus constructed in accordance therewith during which reference will be had to the accompanying drawing, showing, in Fig. 1, a diagrammatic representation of the apparatus, and in Fig. 2 a transverse section thereof on the line 2—2 in Fig. 1, like characters being used to designate the same parts in both figures.

Certain elements of the apparatus may be of any desired character adapted for the performance of their respective functions, their specific construction being but a matter of choice and constituting no part of the invention. However the apparatus shown in the drawing we have found convenient and well adapted for the practice of our said method, and shall herein describe it in connection therewith, it being understood that said apparatus comprises means providing a counterflow of fluids through concentric pipes or tubes forming two separate closed circuits, each carrying a different medium, heat exchange between the respective fluids in the circuits being effected where counterflow along concentric paths takes place, all as will hereinafter more fully appear.

As a cooling medium we prefer to use ammonia in accordance with usual practice in refrigerating and like operations and the refrigerating unit I therefore includes an ammonia compressor (not shown) together with a condenser and receiver or storage tank in which the ammonia liquefied in the condenser is maintained under relatively high pressure, an outlet pipe 2 conveying the ammonia from the receiver to a heat exchange unit, generally designated H, into which it is admitted through an expansion valve 3. The space into which the stream of ammonia passing through the expansion valve 3 is thus released includes interconnected elongated cylindrical passageways 4 extending through outer casings 5 of the heat exchange unit. This space is maintained under relatively low pressure due to the suction of the ammonia compressor in the unit I which continually withdraws gaseous ammonia therefrom through an intake pipe 6, the expansion of the liquid ammonia and its resultant gasification absorbing relatively large amounts of heat from its confining surfaces. The outer casings 5 may desirably be insulated to prevent too great absorption of heat from the atmosphere and a maximum amount of heat is therefore absorbed from the walls of inner casings 7 extending coaxially within the outer casings 5. While we have shown in the drawing only a single pair of these composite heat exchange tubes, a complete unit desirably includes a plurality of them interconnected for continuous flow of the ammonia through the passages 4 between the inner and outer casings, and from one such passage to an adjacent one, and may be of any desired length. A unit which we have found very practical for the purposes of our invention consists of twelve of these double casings, each about 40' long, arranged in parallel, spaced relation, the outer casings 5 being desirably about 8" in diameter and the inner casings 7 about 6" in diameter. In normal use of the apparatus the refrigerating unit is desirably operated to effect continuous flow of ammonia through the circuit described and consequent continuous absorption of heat from the walls of the inner casings 7 throughout the heat exchange unit.

For facilitating a suitable flow through the heat exchange unit of the brine or other solution which is to be cooled, a conveyor of any suitable type may desirably be employed. However, we preferably provide within each inner casing 7 a ribbon conveyor of the character indicated in the drawing comprising a shaft 8 extending longitudinally of the casing and having secured thereto from suitable supports 9 a pair of oppositely disposed spiral metal strips or ribbons 10 so arranged as to scrape the walls of the casing when the shaft is rotated. A sprocket 12 is secured to one end of each shaft externally of the gland heads 13 of the casing which provide end bearings for the shaft, the sprockets on all of the shafts being desirably arranged in vertical alignment to permit a driving chain or link belt (not shown) to be carried thereover to enable all the sprockets to be driven from a common actuating means. In accordance with our invention the ribbons 10 are interrupted at longitudinal intervals of about 10 to 12 feet to provide spaces for supporting bearings 15 having spider legs 16 contacting the walls of the inner casings. Bearings of this character are particularly desirable in that minimum obstruction is offered to the passage of brine through the casings 7 and the accumulation of excessive deposits of salt in the vicinity of the bearings is thereby prevented, the free flow of the brine being also enhanced to some extent, if desired, by the provision of a longitudinal slot 18 in the shaft 8 adjacent each bearing through which a portion of the brine may flow from one side of the bearing to the other.

The outer casings 5 are provided with heads 20 which may be of any desired character adequate to maintain tight joints with and permit the inner casings 7 to project through and beyond them, the ends of the casings 7 being closed by the gland heads 13 which also provide bearing support for the ends of the shafts 8 as described. The several outer casings of the heat exchange unit may be supported on racks 21 or in any other suitable manner in accordance with usual practices.

The inner casings 7 throughout the heat exchange unit are desirably so interconnected, as by cross-over connections 22, that a continuous flow of brine from a brine inlet port 23 through the unit to a brine outlet port 24 is permitted and, as shown by arrows in the drawing, the direction of this flow through the several pipes and through the unit as a whole is desirably counter to the direction of flow of the refrigerating ammonia through the exterior casings so that the brine is subjected to the lowest temperature just prior to leaving the heat exchange unit, since the liquid ammonia admitted through the expansion valve 3 exerts its greatest heat absorbing effect adjacent its point of admission to the relatively low pressure zone in the passages 4 within the outer casings 5.

The apparatus employed for circulating the brine through the brine circuit, including the inner casings 7, may be of any desired specific character and therefore requires no extended description. It preferably comprises, however, a suitable pump 25 having its exhaust port connected through piping 26 to the brine inlet port 23 of the heat exchange unit and its intake port interconnected through a pipe 28 with the brine outlet port 24 thereof, so that, as described, the operation of the pump induces a continuous circulation of the brine from the pump through the inner casings 7 of the heat exchange unit and back to the pump, and we prefer to provide adjacent the intake port of the latter, a valve 30 which may be utilized to control the amount of brine drawn by the pump from the heat exchange unit. Between the valve 30 and the outlet port of the heat exchange unit a pipe 31 is connected into the pipe 28 and controlled by a valve 32, this pipe being adapted to conduct a portion of the cooled brine returning from the heat exchange unit to a filter 33 of suitable character, in which the entrained crystallized salt is removed, the waste fluid filtrate being discharged through a pipe 34 and disposed of in any convenient way. A pipe 35, interconnected with a source of fresh brine carries the latter to the intake port of the pump 25 and is controlled by a valve 36, so that the pump may draw solution both from the cooled brine return pipe 28 and from the fresh brine inlet pipe 35 in proportions depending upon the adjustment of the respective valves.

In the performance of our method with the aid of apparatus of the general character just described, the referating unit is started up and the brine circuit filled with brine, drawn from the source of supply through the pipe 35, by means of the pump 25. After the circuit is so filled, the pump is kept in operation in such manner as to force the brine through the circuit at, preferably, a relatively high velocity, for example about 100' per minute; the heat carried by the brine is therefore absorbed by the refrigerant resulting in a lowering of the temperature of the brine. After the latter has been cooled sufficiently, say to 35° to 40° F., to bring about considerable crystallization, we then withdraw through the pipe 31 a portion of the cooled brine, preferably about one-fifth of it, and introduce it to the filter 33 in which the entrained crystallized salt is removed. The remainder of the stream of chilled brine, supplemented by the addition of a continuous stream of fresh unchilled brine drawn from the pipe 35, in an amount substantially equivalent to that withdrawn for filtration, is then again pumped through the heat exchange unit for further recirculation and cooling therein. Thus once the cycle is established, it may be carried on continuously for any desired period, fresh uncooled brine being constantly supplied to replace the chilled brine delivered to the filter. Of course during these operations, the conveyors within the brine pipes 7 are preferably continuously operated to assist in maintaining the walls of the pipes free of precipitated salt.

As can be readily seen from the drawing, the spider legs 16 supporting bearings 15 contact the walls of casings 7 at spaced points and in relatively small areas only, so that substantially all the inner surfaces of these casings is available for direct contact with the brine, while the form of the spider legs and the bearings is such as to offer but a minimum of obstruction to the free flow of the brine through the casings. Such a flow is further enhanced by the passage of some of the brine through the bearings in slots 18 in the shafts 8, and as the latter are desirably continuously rotated during normal operation, the brine and entrained crystals passing by way of these slots are constrained to follow a somewhat spiral course, thereby effecting thorough agitation of the brine in the casings as a whole and insuring contact of substantially every portion thereof with the casing walls to effect extraction of heat from the brine with maximum rapidity and efficiency.

While we have herein described with considerable particularity one form of apparatus constructed in accordance with our invention which we prefer to use in recovering Glauber's salt from natural brines in accordance with our aforesaid method, it will be understood that the apparatus is equally adapted for the recovery of other substances from their solutions and that changes and modifications in the specific form and arrangement of its several parts will readily occur to those skilled in the art and may be made, if desired, without departing from the spirit or scope of the invention as defined in the appended claims.

Having thus described our invention, we claim and desire to protect by Letters Patent of the United States:

1. In apparatus of the class described, a tubular casing providing a passage adapted to contain a fluid, a shaft extending longitudinally within the casing, means for rotating the shaft, a spiral metal ribbon carried by the shaft and operative to scrape the wall of the casing when the shaft is rotated, cylindrical bearings surrounding the shaft at spaced intervals each provided with a plurality of radially extending legs contacting the casing wall, and means for circulating a fluid through the casing, said shaft having a longitudinal slot adjacent each bearing adapted to form a passage for the fluid from one side of the bearing to the other.

2. In apparatus of the class described, a tubular casing, a rotatable shaft disposed axially therein and having a diametrically extending longitudinal slot, a bearing surrounding the shaft between the ends of the slot, and radially extending legs contacting the inner casing and affording radial support to the bearing.

SIDNEY H. DAVIS.
CARL O. ANDERSON.
RUDOLPH J. STENGL.